US012607598B2

(12) United States Patent
Petzold et al.

(10) Patent No.: US 12,607,598 B2
(45) Date of Patent: Apr. 21, 2026

(54) METHOD AND SYSTEM FOR CALIBRATING A SENSOR DURING REAL-TIME OPERATIONAL USE

(71) Applicant: Endress+Hauser Conducta GmbH+Co. KG, Gerlingen (DE)

(72) Inventors: Holm Petzold, Dresden (DE); Mario Rose, Dußlingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 286 days.

(21) Appl. No.: 18/544,948

(22) Filed: Dec. 19, 2023

(65) Prior Publication Data

US 2024/0210351 A1     Jun. 27, 2024

(30) Foreign Application Priority Data

Dec. 22, 2022    (DE) ..................... 10 2022 134 580.7

(51) Int. Cl.
*G01N 27/41*        (2006.01)
*G01N 27/416*       (2006.01)
*G01N 35/00*        (2006.01)

(52) U.S. Cl.
CPC ...  *G01N 27/4163* (2013.01); *G01N 35/00623* (2013.01); *G01N 2035/00702* (2013.01)

(58) Field of Classification Search
None
See application file for complete search history.

(56) References Cited

U.S. PATENT DOCUMENTS

| | | | | |
|---|---|---|---|---|
| 2011/0076703 | A1* | 3/2011 | Borg | G01N 21/553 |
| | | | | 436/501 |
| 2017/0226563 | A1* | 8/2017 | Chun | G16B 40/00 |
| 2020/0245912 | A1* | 8/2020 | Wu | A61B 5/6801 |

FOREIGN PATENT DOCUMENTS

| | | | |
|---|---|---|---|
| DE | 102019107625 | A1 | 6/2020 |
| JP | 2007310665 | A | 11/2007 |

OTHER PUBLICATIONS

Samuelsson, et al., Sensor bias impact on efficient aeration control using diurnal load variations, Water Science & Technology, 83.6, 2021, 1335-1346 (14 pp.).

(Continued)

*Primary Examiner* — Eric S. McCall
*Assistant Examiner* — Nigel H Plumb
(74) *Attorney, Agent, or Firm* — Mark A. Logan; Endress+Hauser (USA) Holding, Inc.

(57) ABSTRACT

A method for calibrating a sensor during operation includes determining several raw measured values to determine several analyte concentrations of the medium, saving the raw measured values in the sensor memory, analyzing the stored raw measured values using a statistical method, selecting a first reference value from the stored raw measured values based on the analysis, assuming or setting a first expected concentration for the first reference value, converting the first reference value into a first analyte concentration using a built-in conversion function, comparing the first expected concentration with the first analyte concentration, and correcting the built-in conversion function based on the comparison.

10 Claims, 3 Drawing Sheets

(56)            References Cited

OTHER PUBLICATIONS

Samuelsson, Oscar, Sensor Fault Detection and Process Monitoring in Water Resource Recovery Facilities, ACTA Universitatis Upsaliensis, Uppsala Dissertations from the Faculty of Science and Technology, 276 pp.

Pedersen, et al., Reconstruction of corrupted datasets from ammonium-ISE sensors at WRRFs through merging with daily composite samples, Water Reserach 185 (2020) 116227, 12 pp.

Jiang, et al., A deep learning algorithm for multi-source data fusion to predict water quality of urban sewer networks, Journal of Cleaner Production 318 (2201) 128533, 10 pp.

Ching, et al., Advances in soft sensors for wastewater treatment plants: A systematic review, Journal of Water Process Engineering, 44 (2021) 102367, 11 pp.

Haimi, et al., Data-derived soft-sensors for biological wastewater treatment plans: An overview, Environmental Modelling & Software, 47 (2013) 88-107, 20 pp.

Jiang, et al, Data-driven method based on deep learning algorithm for detecting fat, oil, and grease (FOG) of sewer networks in urban commerical areas, Water Research, 207 (2021) 117797, 9 pp.

Newhart, et al, Data-driven performance analyses of wastewater treatment plates: A review, Water Research, 157, (2019) 498-513, 16 pp.

Pons, et al., Effect of lockdown on wastewater characteristics: a comparison of two large urban areas, Water Science & Technology 82.12, 2020, 2813-2822 (10 pp.).

Therrien, et al., A critical review of the data pipeline: how wastewater system operation flows from data to intelligence, Water Science & Technology 82.12, 2020, 2613-2634 (22 pp.).

Wai, et al., Applications of deep learning in water quality management: A state-of-the-art review, Journal of Hydrology 613 (2022) 128332, 26 pp.

Werthschützky, Roland, Sensor Technolgien 2022, AMA Verband für Sensorik und Messtechnik e.V., 148 pp.

* cited by examiner

METHOD AND SYSTEM FOR CALIBRATING A SENSOR DURING REAL-TIME OPERATIONAL USE

CROSS-REFERENCE TO RELATED APPLICATIONS

The present application is related to and claims the priority benefit of German Patent Application No. 10 2022 134 580.7, filed on Dec. 22, 2022, the entire contents of which are incorporated herein by reference.

TECHNICAL FIELD

The invention relates to a method for calibrating a sensor during ongoing operation and to a sensor having an implemented method for calibration.

BACKGROUND

In analytical measurement technology, especially in the fields of water management, of environmental analysis, in industry, e.g. in food technology, biotechnology, and pharmaceutics, as well as for the most varied laboratory applications, measured variables, such as the pH, the conductivity, or even the concentration of analytes, such as ions or dissolved gases in a gaseous or liquid measurement medium, are of great importance. These measured variables can be acquired and/or monitored for example by means of electrochemical sensors, such as optical, potentiometric, amperometric, voltammetric, or coulometric sensors, or also conductivity sensors.

In particular, it is important here that a sensor is calibrated at regular intervals in order to guarantee the quality of the measured values determined by the sensor. However, it should be noted that this calibration should not interrupt the ongoing operation of the sensor. The calibration should thus take place in an inline manner. Removal of the sensor from the process and process interruptions associated therewith are thus to be avoided.

An inline calibration method of a sensor generally known in the prior art is based on a sampling of the measurement medium at a current point in time. The first measured value determined by the sensor at this current point in time is stored. Subsequently, for example in the laboratory, a first reference value is determined by an alternative measurement method, for example. Finally, the sensor is adjusted by the user based on the first reference value. This means that the first measured value is compared with the first reference value. If the two values deviate from one another by a difference value, the first measured value and all future measured values determined by the sensor are corrected by the difference value. This means that the value displayed by the sensor was "adjusted." If, for example, the measured value 7 mg/L was determined by a nitrate sensor, but a reference value of 8 mg/L was determined in the laboratory for the same measuring medium, the displayed value of 7 mg/L is corrected to 8 mg/L. All future displayed values after the adjustment are thus increased by 1 mg/L. The sensor is thus calibrated.

However, this inline calibration method from the prior art has the disadvantage that, in the event of an incorrect reference value, an incorrect adjustment of the sensor is carried out which, under certain circumstances, is not noticed by the user. This means that all displayed measured values are incorrect. The reference value determined in the laboratory can in particular be incorrect because ambient influences that the sensor is exposed to in the process cannot be taken into account during the measurement in the laboratory.

SUMMARY

It is therefore an object of the invention to propose a safe and reliable method for calibrating a sensor during ongoing operation.

This object is achieved according to the invention by a method for calibrating a sensor during ongoing operation according to claim 1.

The method according to the invention comprises at least the following steps:

providing a sensor system with a process vessel, a sensor, a control unit, a memory, wherein a medium flow with cyclical analyte concentrations flows through the process vessel, wherein the sensor in the process vessel is arranged in contact with the medium flow, wherein a conversion function is saved in the memory in order to convert a raw measured value into an analyte concentration, determining a plurality of raw measured values for determining in each case an analyte concentration of the medium flow through the sensor, storing the raw measured values in the memory, analyzing the stored raw measured values using the control unit, selecting at least one first reference value from the stored raw measured values based on the analysis, wherein a first expected concentration is assumed for the at least first reference value, converting the first reference value into a first analyte concentration by means of the conversion function, comparing the first expected concentration with the first analyte concentration, determining a difference factor based on the comparison, correcting the conversion function based on the difference factor, so that a conversion of the first reference value results in a first analyte concentration which is identical to the first expected concentration.

Using the method according to the invention for calibrating a sensor during ongoing operation, it is made possible that no samples have to be taken from the process in order to carry out a calibration of the sensor in a laboratory. This makes it possible for the ambient conditions of the process to be better taken into account during calibration than would be possible in the case of a sample measured in the laboratory. Furthermore, the calibration of the sensor can be carried out completely fully automatically or at least semi-automatically. The calibration can also be reliably checked for plausibility before the application of the calibration, which would not be possible in a calibration method including a laboratory. The method makes it possible that, for example, in the case of a sewage treatment plant, so-called zero loads of the sensor, i.e., when, for example, waste water with negligible loads from the analyte are present in the medium flow, which is frequently the case in particular at certain times at night, can especially be taken into account.

According to one embodiment of the invention, the step of analyzing comprises a minimum value search or a maximum value search of the stored raw measured values.

According to a further embodiment of the invention, in the step of selecting, the first reference value and a second reference value are selected on the basis of the analysis, wherein the first reference value and the second reference value are found by means of the minimum value search or the maximum value search.

According to one embodiment of the invention, the step of analyzing comprises an examination of the raw measured values by means of a statistical method.

According to one embodiment of the invention, the statistical method is a method for determining noise, and the selected first reference value is corrected by noise suppression.

According to one embodiment of the invention, the step of analyzing is applied to a first selection of the stored raw measured values.

According to one embodiment of the invention, after the step of correcting, a calibration point in time dependent on the difference factor is proposed, at which point in time the method is repeated, wherein, during the repetition of the method, a second selection of the stored raw measured values, which is different from the first selection, is used.

According to one embodiment of the invention, the analyte concentrations represent a concentration of chlorine dioxide, ammonium or potassium.

The aforementioned object is also achieved by a sensor system according to claim 9.

The sensor system comprises:

a sensor, a process vessel, a control unit, and a memory, wherein a medium flow with cyclical analyte concentrations flows through the process vessel, wherein the sensor in the process vessel is arranged in contact with the medium flow and is connected to the control unit and the memory, wherein a conversion function is saved in the memory in order to convert a raw measured value into an analyte concentration, wherein the control unit is suitable for performing the method according to the invention for calibrating the sensor.

According to one embodiment of the invention, the sensor is a chlorine dioxide sensor, an ammonium sensor, or a potassium sensor.

BRIEF DESCRIPTION OF THE DRAWINGS

The invention is explained in more detail on the basis of the following description of the figures. In the figures.

DETAILED DESCRIPTION

Figure 1:
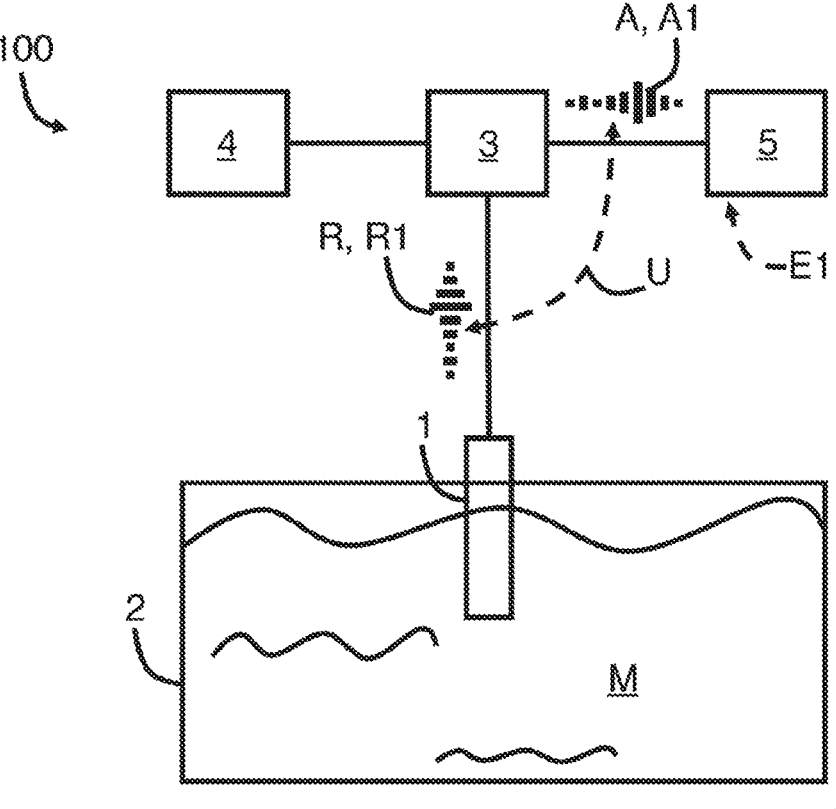
FIG. 1: shows a schematic representation of a sensor system according to the invention.

FIG. 1 shows a schematic representation of a sensor system 100 according to the invention. The sensor system 100 is, for example, part of a sewage treatment plant. The sensor system 100 comprises a sensor 1, a process vessel 2, a control unit 3, and a memory 4. According to the embodiment shown in FIG. 1, the sensor system 100 furthermore comprises a display unit 5. The display unit 5 is, for example, a human-machine interface which makes it possible to display information to a user and for the user to enter information.

A medium flow M with cyclical analyte concentrations A flows through the process vessel 2. The medium flow M is, for example, sewage water. The analyte concentration is, for example, chlorine dioxide concentration, an ammonium concentration or potassium concentration in the sewage water.

Medium flow is understood here to mean a flowing medium, for example, a medium flowing through a channel, and a stationary medium, for example, a medium standing in a basin. The flowing medium or the standing medium is regularly replaced and thus has temporally changed analyte properties. These analyte properties are also cyclical, i.e., the analyte properties that the medium temporarily has are recurring. The analyte properties of the sewage water have, for example, a daily cycle, in which the analyte concentration in the medium flow M is preferably lowest at night.

The sensor 1 is, for example, a chlorine dioxide sensor, an ammonium sensor or a potassium sensor. The sensor 1 is arranged in the process vessel 2 and is in contact with the medium flow M. The sensor 1 is connected to the control unit 3.

The control unit 3 is, for example, a microcontroller or another computing unit. The control unit 3 has a memory 4 or is connected to a memory 4. A conversion function U is saved in the memory 4 in order to convert a raw measured value R into an analyte concentration A corresponding to the raw measured value R.

Raw measured value R is preferably understood to mean the voltage value determined by the sensor 1. Analyte concentration A is understood to mean the concentration of an analyte present in the medium flow M. The analyte concentration A can be calculated based on the raw measured value R determined by the sensor 1.

Figure 2:
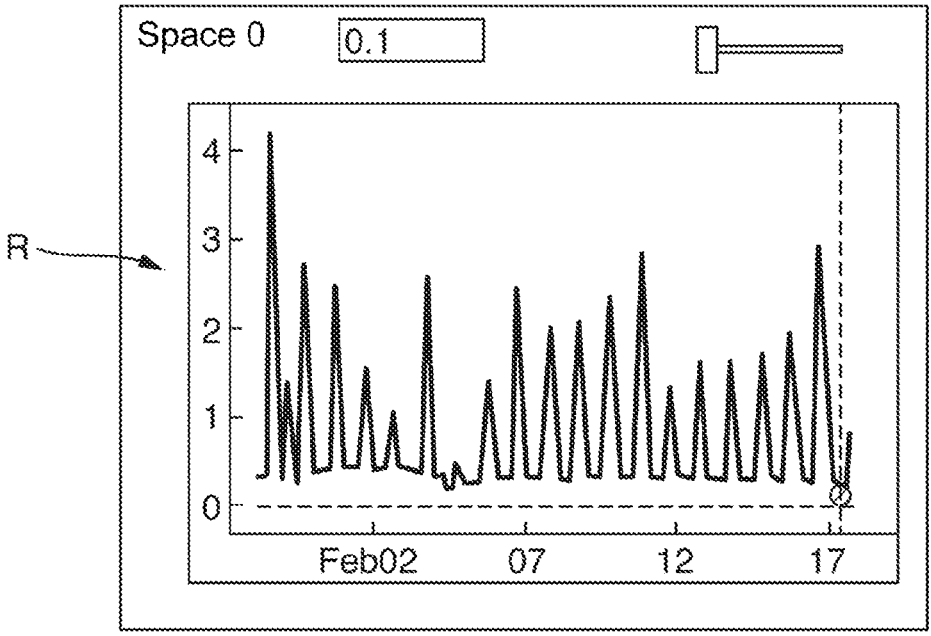
FIG. 2: shows an exemplary representation of analyte concentrations which have been converted based on raw measured values determined by a sensor.

FIG. 2 shows an exemplary representation of analyte concentrations A, which were converted based on raw measured values R determined by a sensor. The X-axis is the time axis, and the Y-axis is, for example, an ammonium concentration in mg/L. As can be seen, the minima of the analyte concentrations are at no time at 0 mg/L. The display unit 5 is suitable for displaying the raw measured values R graphically, for example, as shown in FIG. 2.

In the following, the method according to the invention for calibrating a sensor 1 during ongoing operation is described in detail.

A first step comprises providing the sensor system 100 described above. The sensor system 100 is ready to function and the sensor 1 is in contact with the medium flow M.

In a next step, a plurality of raw measured values R are determined for determining a plurality of analyte concentrations A of the medium flow M by means of the sensor 1. The analyte concentrations A represent, for example, a concentration of chlorine dioxide, ammonium or potassium.

Subsequently, a step of storing the raw measured values R in the memory 4 takes place.

Furthermore, a step of analyzing the stored raw measured values R is carried out by the control unit 3. According to one embodiment of the method, the step of analyzing comprises a minimum value search or a maximum value search of the stored raw measured values R. In other words, this means that extreme values, in particular load minima or load maxima, are identified in the stored raw measured values R. At these points in time, the medium flow M thus has a minimum or maximum analyte concentration or analyte load. According to one embodiment of the method, the step of analyzing comprises an examination of the raw measured values R by means of a statistical method. According to one embodiment of the method, the statistical method is a method for determining noise. According to one embodiment of the method, the step of analyzing is applied to a first selection of the stored raw measured values R.

A step of selecting at least one first reference value Ref1 from the stored raw measured values R then takes place based on the analysis, wherein a first expected concentration E1 is assumed for the at least first reference value Ref1. The first expected concentration E1 is entered, for example, by the user manually on the display unit 5 (shown by a dashed arrow in FIG. 1). According to an alternative embodiment, by analyzing the raw measured values R, the control unit 3 automatically detects at least one first expected concentration E1, for example, a zero point, i.e., a measurement point at which the analyte concentration must be equal to zero. For example, the analyte concentration daily between 12:00 AM and 4:00 AM is approximately equal to zero.

According to one embodiment of the method, in the step of selecting, the first reference value Ref1 and a second reference value Ref2 are selected based on the analysis. Wherein the first reference value Ref1 and the second reference value Ref2 were found by means of the minimum value search or the maximum value search.

Next, a step of converting the first reference value Ref1 into a first analyte concentration A1 takes place using the conversion function U, which is saved in the memory 4 or the control unit 3. The conversion function U is a reversible mapping of the raw measured values R to the values of the corresponding analyte concentrations A. The reversibility of the conversion function U is shown in FIG. 1 by the dashed double arrow.

After that, a step of comparing the first expected concentration E1 with the first analyte concentration A1 takes place.

In a next step, a difference factor is determined based on the comparison. If, for example, it was determined during comparison that the expected concentration E1 corresponds to the first analyte concentration A1, the difference factor is equal to 1. If, on the other hand, it was determined, for example, during comparison that the expected concentration E1 does not correspond to the first analyte concentration A1, but the expected concentration E1 is twice as high as the first analyte concentration A1, the difference factor is equal to 2.

Finally, a step of correcting the conversion function U is carried out based on the difference factor, so that a conversion of the first reference value Ref1 results in a first analyte concentration A1 that is identical to the first expected concentration E1.

Figure 3:
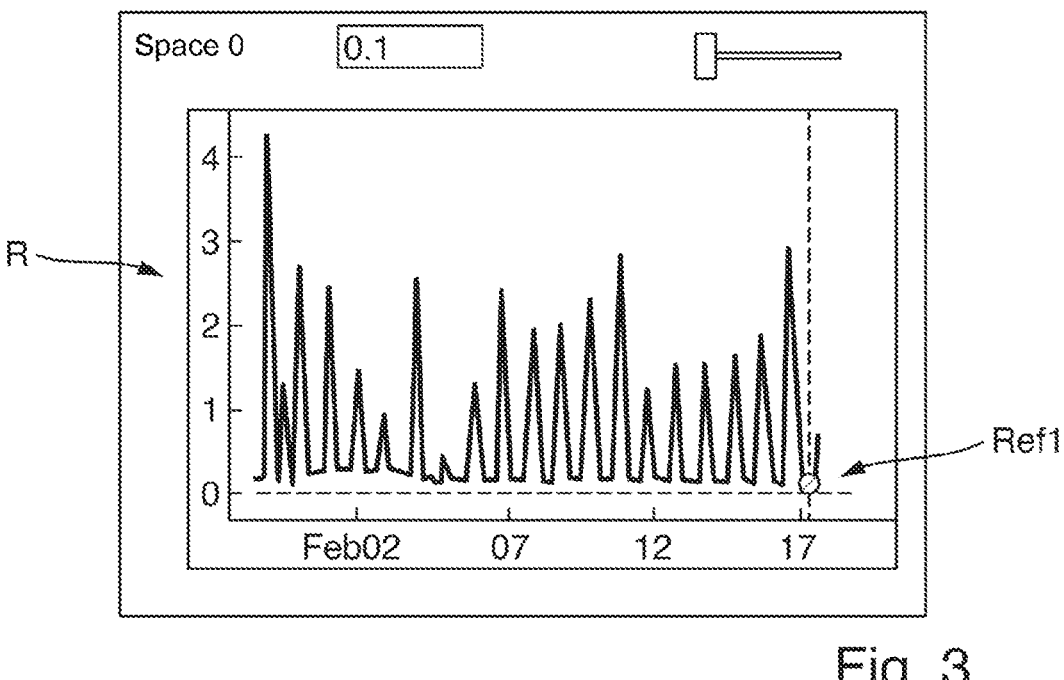
FIG. 3: shows an exemplary representation of an adjustment of the raw measured values from FIG. 1 by a reference value determined by the method according to the invention.

FIG. 3 shows analyte concentrations A that were converted by the conversion function U based on raw measured values R determined by the sensor 1. However, the corrected conversion function U was used in the conversion. During the correction, the first reference value Ref1 was taken into account. The point in time of the first reference value Ref1 was indicated in FIG. 3. The X-axis is the time axis, and the Y-axis is, for example, an ammonium concentration in mg/L. As can be seen, the minima of the analyte concentrations now are at 0 mg/L at the point in time of the first reference value Ref1. The analyte concentrations A are more precise than uncorrected analyte concentrations A from FIG. 2.

Figure 4:
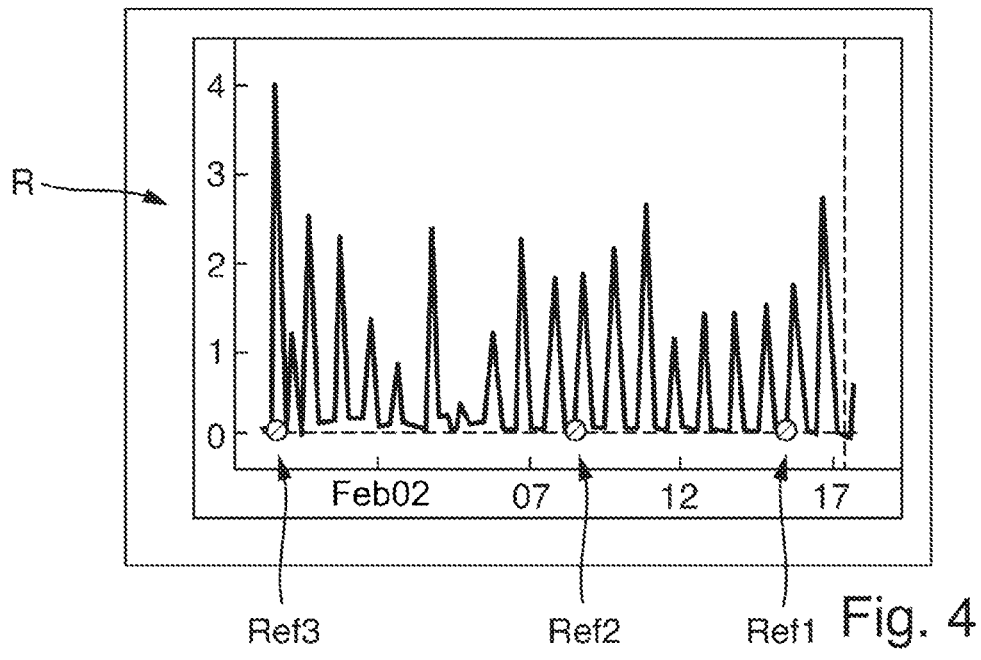
FIG. 4: shows an exemplary representation of an adjustment of the raw measured values from FIG. 1 by three reference values determined by the method according to the invention.

FIG. 4 shows analyte concentrations A that were converted based on raw measured values R determined by the sensor 1. However, the corrected conversion function U was used in the conversion. During the correction, the first reference value Ref1, a second reference value Ref2 and a third reference value Ref3 were taken into account. The point in time of the first reference value Ref1, of the second reference value Ref2 and of the third reference value Ref3 was indicated in FIG. 3. The X-axis is the time axis, and the Y-axis is, for example, an ammonium concentration in mg/L. As can be seen, the minima of the analyte concentrations are now at 0 mg/L at the point in time of the first reference value Ref1, of the second reference value Ref2 and of the third reference value Ref3. The analyte concentrations A are more precise than uncorrected analyte concentrations A from FIG. 2.

Figure 5:
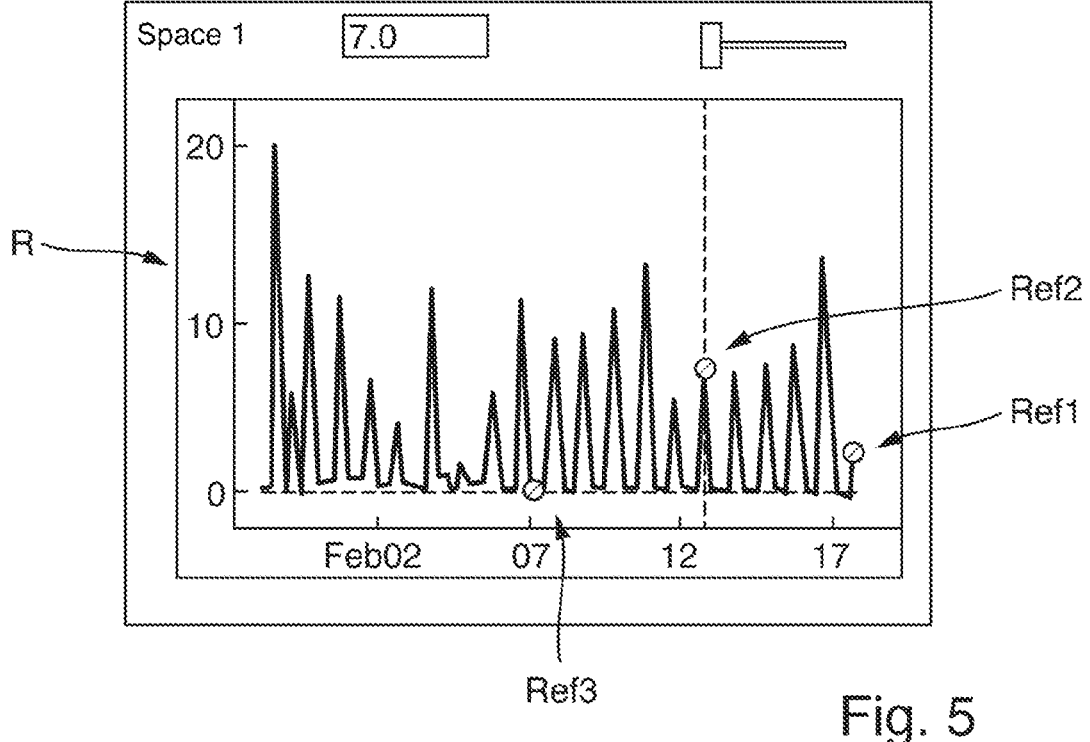
FIG. 5: shows an exemplary representation of an adjustment of the raw measured values from FIG. 1 by three reference values determined by the method according to the invention.

FIG. 5 differs from FIG. 4 in that the point in time of the second reference value Ref2 was selected such that the second reference value Ref2 corresponds to a local maximum of the raw measured values R.

According to one embodiment of the invention, a step of proposing a calibration point in time at which the method is repeated takes place after the step of correcting, wherein a second selection of the stored raw measured values (R), which is different from the first selection, is used during the repetition of the method. The proposal of the calibration point in time is dependent on the difference factor.

According to one embodiment of the invention, a step of checking the plausibility of the difference factor takes place before the step of correcting all stored raw measured values R. For this purpose, for example, the difference factor is applied to all stored raw measured values R in order to calculate correction values using the conversion function U. These correction values are then checked for plausibility. This check is carried out by searching for distinctive values, for example, extremes, within the correction values. For example, the search is carried out for zeros, i.e., minimum values. That is to say, at these points, the user knows that the sensor would have to measure an analyte concentration equal to zero. This is the case, for example, during a cleaning phase of the sensor, for example, during CIP (cleaning in process). The plausibility check thus calculates the corresponding analyte concentration for the found minimum values of the correction values. This conversion takes place with the conversion function U saved in the control unit 3 or in the memory 4. If the converted analyte concentration deviates from the expected analyte concentration, i.e., for example, zero, the plausibility check generates a warning message. If the converted analyte concentration corresponds to the expected analyte concentration, i.e., for example, zero, the plausibility check generates a confirmation message. The plausibility check has the advantage that errors in the alignment, i.e., when correcting the displayed analyte concentrations, can be easily discovered.

The invention claimed is:

1. A method for calibrating a sensor during operation, comprising:

providing a sensor system including a process vessel, a sensor, a control unit, and a memory, wherein a medium flow with cyclic analyte concentrations flows through the process vessel, wherein the sensor is arranged in the process vessel in contact with the medium flow, and wherein a conversion function is stored in the memory to convert a raw measured value into an analyte concentration;

determining a plurality of raw measured values to determine an analyte concentration of the medium flow through the sensor;

saving the raw measured values in the memory;

analyzing the stored raw measured values by the control unit;

selecting a first reference value from the stored raw measured values based on the analysis, wherein a first expected concentration is assumed for the reference value;

converting the first reference value into a first analyte concentration using the conversion function;

comparing the first expected concentration with the first analyte concentration;

determining a difference factor based on the comparison; and correcting the conversion function based on the difference factor so that a conversion of the first reference value results in a first analyte concentration that is identical to the first expected concentration.

2. The method according to claim 1, wherein the step of analyzing includes a minimum value search or a maximum value search of the stored raw measured values.

3. The method according to claim 2, wherein in the step of selecting, the first reference value and a second reference value are selected based on the analysis, wherein the first reference value and the second reference value are found via the minimum value search or the maximum value search.

4. The method according to claim 1, wherein the step of analyzing includes examining the raw measurement values using a statistical method.

5. The method according to claim 4, wherein the statistical method is a method for determining a noise and the selected first reference value is corrected by noise suppression.

6. The method according to claim 1, wherein the step of analyzing is applied to a first selection of the stored raw measurement values.

7. The method according to claim 6, wherein after the step of correcting the conversion function, the method further comprises:

proposing a calibration point in time that is dependent on the difference factor, wherein the method is repeated at the calibration point in time, wherein in the repetition of the method a second selection of the stored raw measured values, which is different from the first selection, is used.

8. The method according to claim 1, wherein the analyte concentrations represent a concentration of chlorine dioxide, ammonium, or potassium.

9. A sensor system, comprising:

a sensor, a process vessel, a control unit, and a memory, wherein a medium flow with cyclic analyte concentrations flows through the process vessel, wherein the sensor is arranged in the process vessel in contact with the medium flow and is connected to the control unit and the memory, wherein a conversion function is stored in the memory to convert a raw measured value into an analyte concentration, and wherein the control unit is configured to:

determine a plurality of raw measured values to determine an analyte concentration of the medium flow through the sensor;

save the raw measured values in the memory;

analyze the stored raw measured values by the control unit;

select a first reference value from the stored raw measured values based on the analysis, wherein a first expected concentration is assumed for the reference value;

convert the first reference value into a first analyte concentration using the conversion function;

compare the first expected concentration with the first analyte concentration;

determine a difference factor based on the comparison; and correct the conversion function based on the difference factor so that a conversion of the first reference value results in a first analyte concentration that is identical to the first expected concentration.

10. The sensor system according to claim 9, wherein the sensor is a chlorine dioxide sensor, an ammonium sensor, or a potassium sensor.

* * * * *